Figures 1, 2, 3, 4, 5:
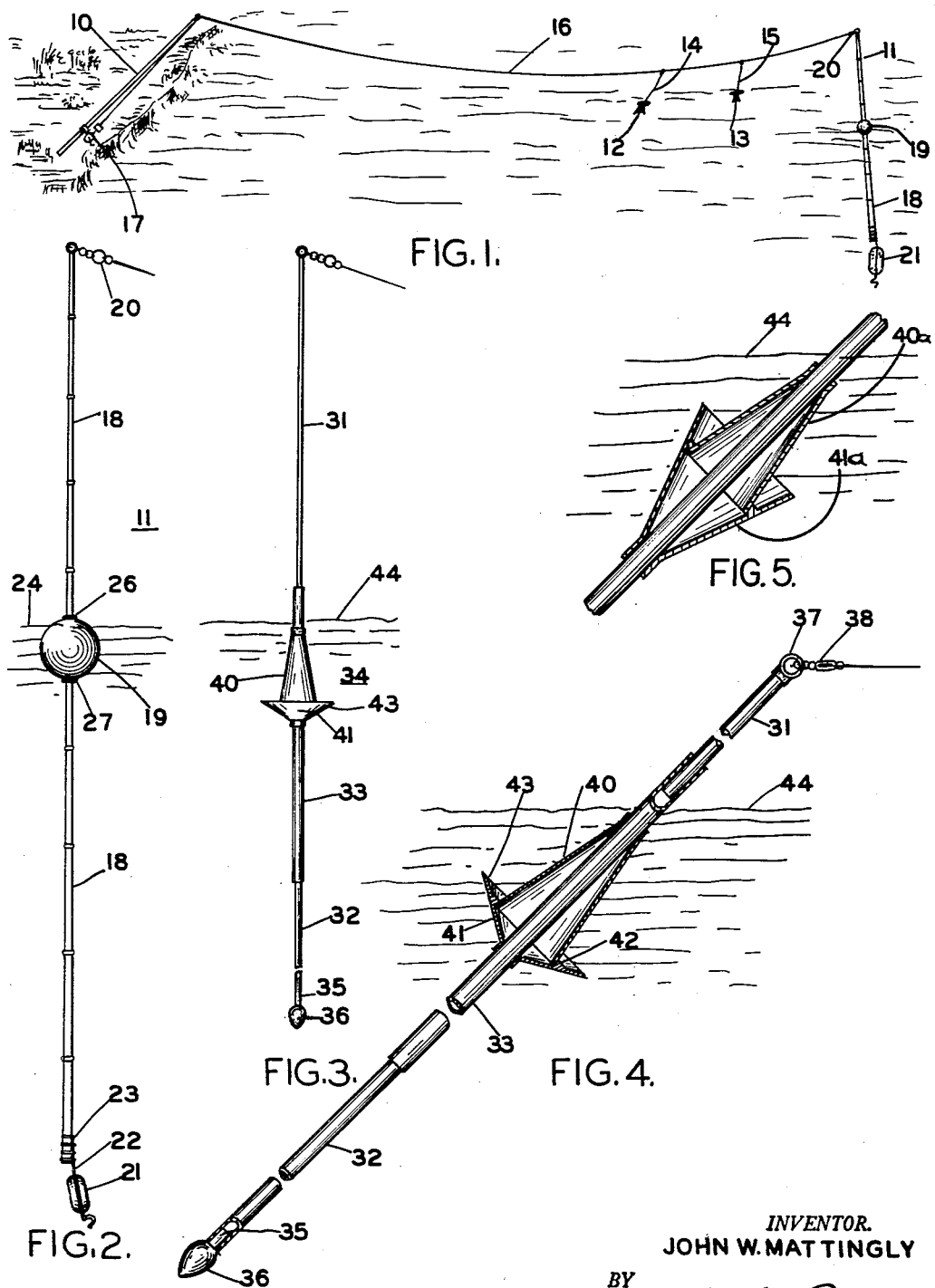

Nov. 28, 1961   J. W. MATTINGLY   3,010,244
FISHING TACKLE
Filed Nov. 4, 1957

INVENTOR.
JOHN W. MATTINGLY
BY
ATTORNEYS

United States Patent Office 3,010,244
Patented Nov. 28, 1961

3,010,244
FISHING TACKLE
John W. Mattingly, 503 S. Grant, Fort Collins, Colo.
Filed Nov. 4, 1957, Ser. No. 694,176
2 Claims. (Cl. 43—43.1)

This invention relates to fishing tackle and particularly to an improved device for facilitating the casting and manipulation of light lures such as artificial flies.

In the art of fly fishing it is the usual practice to attach one or two artificial flies to a leader which is attached to a line having sufficient weight or body so that the fly may be cast for substantial distances. The distance to which light lures, such as flies, may be cast is, of course, limited. For heavier lures, such as metal spoons, spinners and the like, great distances may be realized by employing a so-called spinning or free-line reel and a strong light weight line such as a monofilament nylon line. Satisfactory casting with the spinning reel requires that the lure have sufficient weight to draw the light line from the reel, and light lures such as flies are employed only with the addition of weight such as may be secured by using a relatively heavy float; for example, a float may be employed which comprises a plastic bubble partially filled with water which provides the weight necessary to draw the line from the reel. The various arrangements employed heretofore for fishing with light lures at great distances have not proved entirely satisfactory in all respects, and accordingly it is an object of the present invention to provide an improved device for facilitating the casting and manipulation of light lures such as artificial flies.

It is another object of this invention to provide an improved device for holding flies or other light lures at or near the surface of the water.

It is another object of this invention to provide an improved fishing device for maintaining lures such as artificial flies in fish attracting positions for extended periods of time.

It is another object of this invention to provide an improved fishing device whereby light lures such as artificial flies may be manipulated in and near the water with a more life-like action.

It is a further object of this invention to provide an improved device for the casting of flies and light lures and which is of simple construction and easy to cast.

In carrying out the objects of this invention in one embodiment thereof, a slender shaft of bamboo or other strong light material is provided with a line attaching means at one end and a weight at the other end, and intermediate the ends there is positioned a float which is arranged to hold the device in position in the water so that the weight falls below the float and holds the line attaching end high above the surface of the water. The line is attached to the device and flies or other light lures are suspended from the line in the vicinity of the device so that they may be held above the surface of the water and caused to "dance" or be allowed to float as desired. The device has sufficient weight to be cast with a spinning rod and reel. In another embodiment of the invention the float is formed of plastic material with an inverted cone base so that on tipping of the device the base causes increased resistance to the movement in the water and retains the lures in position for a longer period of time. Plastic shafts or rods are employed in this latter device and provide additional buoyancy, they being sealed to provide elongated air chambers.

The features of novelty which characterize my invention are set forth with particularity in the appended claims. My invention itself, however, both as to its organization and method of operation together with further objects and advantages thereof may best be understood by reference to the following description taken in connection with the accompanying drawing in which:

FIGURE 1 is a somewhat diagrammatic illustration of a fishing device embodying my invention while in use;
FIGURE 2 is an enlarged detail elevation view of the fishing device shown in FIGURE 1;
FIGURE 3 is a view similar to FIGURE 1 illustrating a modified form of the invention;
FIGURE 4 is an enlarged detail view of a portion of the device of FIGURE 3 shown in one position during operation; and FIGURE 5 is a sectional view through the front of a modified form of the device of FIGURES 3 and 4.

Referring now to the drawing, FIG. 1 illustrates a fishing rod 10 and a device 11 embodying the invention employed for fishing with light lures 12 and 13 attached to drop lines or leaders 14 and 15, respectively; the drop lines are secured to a line 16 connected between the top of device 11 and a reel 17 attached to the rod 10 in the usual manner. Reel 17 and rod 10 are of the so-called spinning type usually employing a fine nylon or other high tensile strength fibre line for casting lures substantial distances and then retrieving them. The device 11 as illustrated comprises an upright shaft 18 which extends through a hollow float 19 and is secured therein. A swivel connector 20 may be provided at the top of the rod 18 and the line 16 is shown attached to this swivel. The device is held upright by a weight 21 attached to the lower end of the shaft 18 so that the lower end is held downwardly. For casting light lures by the use of the present device, the line is reeled in until the nearer drop leader 14 is adjacent the top of the rod 10 and the device is then cast with a swinging movement of the rod to throw it out toward the area to be fished so that it carries the flies 12 and 13 after it; when it has landed in the water, the device 11 floats upright so that the flies 12 and 13 may be held out of the water if desired and allowed to float at the surface or dance near the surface and occasionally touch the surface. The action which may be secured in this manner is very life-like and has been found to attract fish effectively.

The details of construction of the device 11 will more readily be apparent from the illustration in FIG. 2. As shown in this figure the weight 21 is secured on a short length of flexible cord or similar material 22 which is bound or otherwise secured to the lower end of the shaft 18 as indicated at 23. The weight 21 is preferably of the split shot type so that it may be moved readily and replaced by a weight of different size. The purpose of making the weight interchangeable is to provide an arrangement for floating the device at various levels according to the desire of the fisherman. As illustrated in the drawing, the weight 21 and float 19 are selected of such sizes that the device floats with the water level at 24 slightly below the top of the float 19. In the illustrated form the float 19 comprises a hollow sphere which may be a ping-pong ball provided with diametrically opposite openings through which the shaft 18 passes and about which the ball is cemented and sealed to the shaft by upper and lower seals 26 and 27, respectively. The shaft 18 may be made of any suitable material which has the desired lightness and strength and, for example, may be a length of bamboo as illustrated. In practice a straight bamboo rod about two feet long employed with a float made from a ping-pong ball has been found effective for the casting and manipulation of light lures such as artificial flies.

In the use of the device just described, one or two artificial flies are secured to the line at distances of, say, from one to four feet from the top of the device 11, the distances and positions being determined by the individual fisherman's judgment. By tightening the line while the device is in the water, light lines such as monofilament nylon may be lifted entirely from the water so that the flies may be held in position above the water or allowed to quiver or dance on the water.

The buoyancy of the device as determined by the size of the float 19 and the weight 21 may be adjusted so that the device floats at the desired level. In the drawing it has been shown arranged with the float nearly submerged. It has been found desirable for the purpose of minimizing disturbances of the water to have the float submerged so that only the shaft projects through the surface of the water.

The modification illustrated in FIGS. 3 and 4 is essentially similar to that of FIG. 2 but provides additional advantages. In this embodiment the shaft, corresponding to the shaft 18 of FIG. 2, comprises upper and lower tubular sections 31 and 32 connected to a larger central tubular section 33. The sections 31 and 32 are preferably made to fit snugly into the ends of the section 33 and hold the device together by a friction fit; this provides a sufficient water seal and also a "take-down" feature so that the device may be stored or carried in a tackle box when not in use. A double conical float 34 is mounted coaxially about the central section 33 and is sealed thereto. The tubular sections and the float have been illustrated as made of a clear plastic material, however, other materials may, of course, be employed. The outer ends of the sections 31 and 32 are closed so that the tubular shaft provides additional buoyancy. The lower section 32 is sealed about an extension 35 on a lead or other metal weight 36, and the top section 31 is sealed about the base of an eyelet 37 to which a swivel 38 is attached in the usual manner. The weight 36, as illustrated, is of pointed or streamlined form which lessens the tendency to splash when the device drops into the water.

The float 34 is constructed and arranged so that it provides minimum disturbance of the surface of the water and further provides additional resistance to tilting and to lateral movement of the device in the water. The upper conical section, indicated at 40, is more pointed than the lower section indicated at 41, and produces little disturbance of the surface of the water when the device is bobbing up and down. The lower section is flatter and of substantially greater diameter than the upper section and is provided with an internal ring or annular step 42 against which the base of the upper section rests. The lower cone thus extends beyond the upper to provide a flange 43 which extends transversely of the axis of the shaft and opens upwardly. This flange provides substantial resistance to upward movement of the float and also reduces lateral or axial movement when the device is tipped to a point such as indicated in FIG. 4. Thus the device tends to remain in position and resists movement; this facilitates the manipulation of lures such as artificial flies because the device tends to remain upright and to resist tilting so that the lures may be kept in action over extended periods of time. When the tension of the line is increased as on rewinding it tends to turn the device about the float as a fulcrum; this turning movement is resisted by the weight and by the paddle or baffle action of the lower base. The flange 43 provides increased resistance to lateral movement upon increased tilt from the vertical, thus the flange tends to stabilize the action of the device. The lower section 41 may be made more pointed if desired in order to further lessen the splash when the device is dropped into the water. Such form is shown in FIG. 5 where the upper and lower sections are designated by the numerals 40a and 41a, respectively.

The size of the weight and thus the buoyancy of the device is selected to secure the desired floating position of the device. For most purposes it has been found desirable to float the device of FIGS. 3 and 4 slightly below the level of the water as indicated at 44. This assures minimum disturbance of the surface of the water.

It has been found that the device is more stable in the water when the distance from the weight to the water line is greater than the length of the device above the water line.

While specific forms of the invention have been illustrated, various modifications and other arrangements will occur to those skilled in the art. Therefore, it is not desired that the invention be limited to the details of construction illustrated and described and it is intended by the appended claims to cover all modifications which fall within the spirit and scope of the invention.

I claim:
1. A device for facilitating the casting and manipulation of artificial flies and other light weight fishing lures comprising an elongated member of substantial length, means at the upper end of said member for attaching a casting line, a float attached to said member intermediate the ends thereof, a weight near the lower end of said member whereby said member floats upright in the water with said upper end a substantial distance above the surface of the water and affords easy manipulation of a lure depending from the line to hold the lure in or near the surface of the water and to effect a dancing movement of the lure, said float comprising two conical portions, the lower conical portion being inverted and the upper portion having a smaller base than that of the lower conical portion and engaging the inner surface of the lower conical portion whereby said lower portion forms a conical flange concave towards said upper end of said member and provides substantial resistance to movement of the device when pulled through the water by the line.

2. A device for facilitating the casting nad manipulation of artificial flies and other light weight fishing lures comprising a float member, two slender shaft portions extending in longitudinal alignment with one another from opposite ends of said float member, means at the end of one of said shaft portions remote from said float member for attaching a casting line, a weight secured near the end of the other of said shaft portions remote from said float member whereby said device floats with said shaft portions upright in the water, the buoyancy of said device being sufficient to maintain the upper end of said one shaft portion a substantial distance above the surface of the water whereby the end of a casting line attached to the upper end of said device is held clear of the surface of the water and affords easy manipulation of a lure depending from the line in the vicinity of the device to enable the lure to be held selectively in or near the surface of the water for effecting a dancing movement of the lure on and above the surface of the water, one end of said float being so shaped as to form a substantially conical baffle surface of substantial area wherein the apex of the cone faces toward the weight-carrying shaft portion and acts as a brake providing resistance to movement when said device is drawn through the water by manipulation of the casting line, the length of each said shaft portion being of the order of not less than four times the width of said float member transverse to the shaft axis.

References Cited in the file of this patent

UNITED STATES PATENTS

| | | |
|---|---|---|
| 989,145 | Hatchett | Apr. 11, 1911 |
| 2,004,414 | Menefee | June 11, 1935 |
| 2,456,254 | Caruso | Dec. 14, 1948 |
| 2,500,078 | Ingram | Mar. 7, 1950 |
| 2,598,140 | Shukites | May 27, 1952 |
| 2,803,081 | Nicholson | Aug. 20, 1957 |
| 2,817,923 | Wertz | Dec. 31, 1957 |